March 29, 1949.   P. K. CHATTERJEA ET AL   2,465,352
CONTROL CIRCUIT USING HIGH TEMPERATURE
COEFFICIENT RESISTANCE ELEMENTS
Filed May 20, 1943
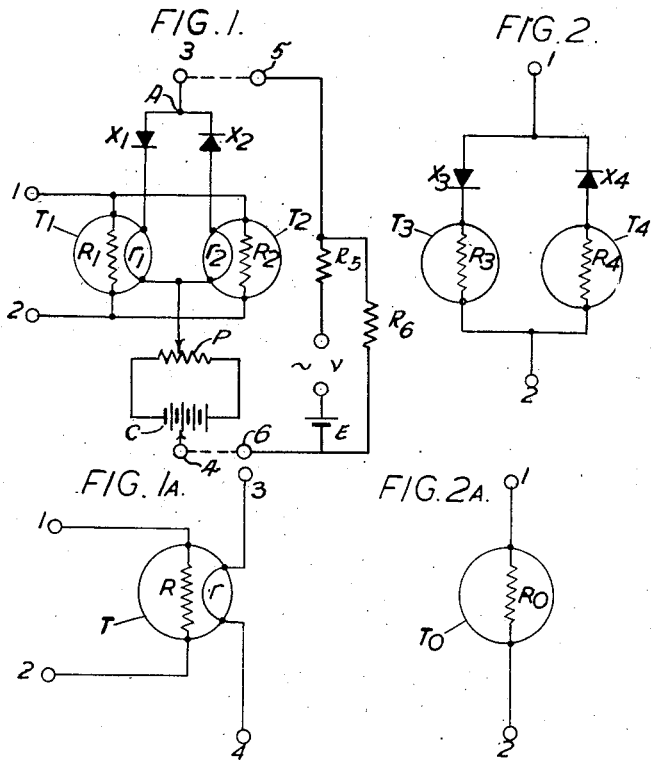
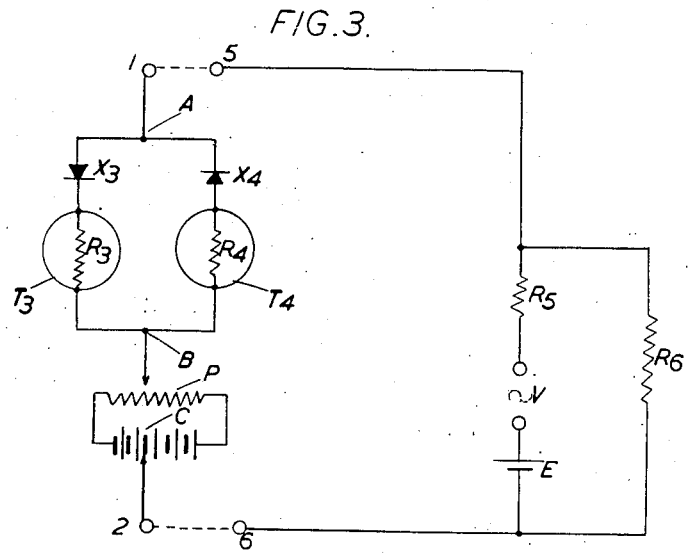
INVENTORS
P. K. Chatterjea
C. T. Scully
BY
Edward D. Phinney
ATTORNEY Patented Mar. 29, 1949

2,465,352

UNITED STATES PATENT OFFICE 2,465,352

CONTROL CIRCUIT USING HIGH-TEMPERATURE COEFFICIENT RESISTANCE ELEMENTS

Prafulla Kumar Chatterjea and Charles Thomas Scully, London, England, assignors, by mesne assignments, to International Standard Electric Corporation, New York, N. Y., a corporation of Delaware Application May 20, 1943, Serial No. 487,696
In Great Britain July 17, 1942

3 Claims. (Cl. 323—68)

The present invention relates to thermally sensitive resistance elements known as thermistors, and in particular has as one object the provision of circuit arrangements for improving or otherwise modifying the response to alternating currents of such thermistors.

Another object is to increase the limits of variation of thermistors supplied with alternating current.

Yet another object is so to modify thermistors connected to supply sources having both alternating and direct current components therein that undesired effects of the direct current are eliminated.

Thermistors have been in use for some years and are characterised by a temperature coefficient of resistance which may be either positive or negative and which is moreover many times the corresponding coefficient for a pure metal such as copper. This property renders thermistors particularly suitable for a variety of special applications in electric circuits.

Various different materials are available for the resistance element of a thermistor, these various materials having different properties in other respects; as one example, a resistance material having a high negative temperature coefficient of resistance comprises a mixture of manganese oxide and nickel oxide, with or without the addition of certain other metallic oxides, the mixture being suitably heat treated.

Thermistors have been employed in two different forms: (a) known as a Directly heated thermistor and comprising a resistance element of the thermally sensitive resistance material provided with suitable lead-out conductors or terminals, and (b) known as an Indirectly heated thermistor comprising the element (a) provided in addition with a heating coil electrically insulated from the element. A directly heated thermistor is primarily intended to be controlled by the current which flows through it and which varies the temperature and also the resistance accordingly. Such a thermistor will also be affected by the temperature of its surroundings and may therefore be used for thermostatic control and like purposes with or without direct heating by the current flowing through it. An indirectly heated thermistor is chiefly designed to be heated by a controlling current which flows through the heating coil and which will usually, but not necessarily, be different from the current which flows through the resistance element, but this type of thermistor may also be subjected to either or both of the types of control applicable to a directly heated thermistor.

More detailed information on the properties of thermistors will be found in an article by G. L. Pearson in the Bell Laboratories' Record, December 1940, page 106.

If an alternating current be passed through the heating coil of an indirectly heated thermistor, the instantaneous power dissipated varies between zero and a maximum value twice per cycle of the alternating current. Since the resistance changes of the thermistor element are consequent on the changes of temperature and since the heating and cooling of the element may take appreciable time, its resistance will vary between two limits twice per cycle of the alternating current and the variation will lag behind the corresponding variation in the instanteneous heating power As the frequency of the alternating current is raised, so the limits of variation of the resistance of the thermistor will approach one another until ultimately it will assume a substantially constant value depending on the mean power applied. Similar arguments apply to directly heated thermistors.

If alternate half waves of the current supplied to the thermistor be suppressed, it will continue to cool during the periods of these half waves, and so the resistance variation will not only have the same period as the alternating current, but the limits of variation will be increased. If two similar thermistors are connected in parallel and supplied with alternate half waves the resistance variation of the combination will again have twice the period of the alternating current but the limits of variation will be greater than those for an equivalent single thermistor operated in the usual way.

By connecting the two thermistors in series instead of in parallel, and/or by choosing two thermistors having different characteristics, the combination may be given various other properties.

According to the invention, therefore, there is provided a non-linear electrical resistance network for alternating current comprising two thermistors, and means for supplying the positive half wave of the alternating current to one thermistor and the negative half wave to the other thermistor.

The invention will be described with reference to the accompanying drawing in which—

Figs. 1 to 3 show schematic circuit diagrams of embodiments of the invention, and in which Figs. 1A and 2A show diagrams of single thermistors.

Fig. 1 shows a non-linear resistance network comprising two indirectly heated thermistors $T_1$ and $T_2$ with their resistance elements $R_1$ and $R_2$ connected in parallel to the terminals 1 and 2. The corresponding heating coils $r_1$ and $r_2$ are connected in series respectively with oppositely directed rectifiers $X_1$ and $X_2$ and in parallel between the terminals 3 and 4. If a source of alternating current be connected to terminals 3 and 4 the positive half waves will pass through $r_1$ but not through $r_2$ and the negative half waves through $r_2$ but not through $r_1$. Thus in accordance with the above explanation, if the thermistors are both of the same type, the resistance variation at terminals 1 and 2 will be greater than if a single thermistor $T$, $R$, $r$, had been used in the manner indicated in Fig. 1A. The rectifiers can be of the copper oxide type, but may also be diodes or unidirectional devices of any known type.

Fig. 2 shows another resistance network using two directly heated thermistors according to the invention, making a circuit equivalent externally to the single thermistor $T_0$, $R_0$, shown in Fig. 2A.

The resistance elements $R_3$ and $R_4$ of the thermistors $T_3$ and $T_4$ are respectively connected in series with oppositely directed rectifiers $X_3$ and $X_4$ forming two parallel circuits connected between the terminals 1 and 2. Thus, only the positive half waves of an alternating current applied to these terminals will pass through $R_3$ and only the negative half waves through $R_4$.

If the external circuit should contain a source of direct current, one or both of the thermistors will be biassed and it may be desirable to eliminate the effect of this source. The simplest way is to connect the terminals 3 and 4 of Fig. 1 or terminals 1 and 2 of Fig. 2 to the secondary winding of a transformer the primary winding of which is connected in series with the external circuit, by which means the direct current component will be removed from the thermistors; and auxiliary resistances may if desired to connected in series and/or in parallel with the primary winding. However, this may not always be possible or desirable, and another method is shown in Fig. 3, for directly heated thermistors. The thermistors $T_3$ and $T_4$ and the rectifiers $X_3$ and $X_4$ may be the same as in Fig. 2 but the connection to terminal 2 is made through a potentiometer P connected across a battery or other suitable constant potential source C having a suitable intermediate point connected to terminal 2.

An external circuit to which the thermistor combination might be connected is diagrammatically shown connected to the terminals 5 and 6 and may be supposed to consist of a direct current source E, an alternating potential source V in series with a resistance $R_5$. A resistance $R_6$ is provided to indicate the direct current path in the circuit. Any circuit may be reduced to a skeleton of this type, and so the explanation is general.

In order to eliminate the effect of the source E, it is necessary to arrange so that the points A and B are at the same potential, assuming for the moment that the alternating potential V is zero. Assuming that $R_5$ includes the resistance of the source V, the potential at A will be $ER_5/(R_5+R_6)$ and provided that the total potential of the source C is at least equal to $2E$ a setting can be found on the potentiometer P which will bring A and B to the same potential whatever may be the sign of E or the values of $R_5$ and $R_6$. This adjustment having been made, when the alternating potential V is switched on, the thermistors will behave as if no direct current sources were present.

The potentiometer P could be omitted if desired, if the battery or source C were provided with taps sufficiently closely spaced. This same arrangement can be applied to the arrangement of Fig. 1, wherein the corresponding numerals to those of Fig. 3, represent the same elements and their functions.

It will be evident that an arrangement similar to Fig. 3 is also applicable to indirectly heated thermistors. In such a case the portion of the circuit between the points A and B of Fig. 3 would be removed and replaced by the circuit between the terminals 3 and 4 of Fig. 1.

The circuits which have been described may be modified in various ways while retaining the principal feature of the invention, namely that the positive and negative half-waves of the alternating current are applied respectively to the two thermistors.

Thus, in Fig. 1, the resistance elements $R_1$ and $R_2$ could be connected in series instead of in parallel to the terminals 1 and 2 and a different kind of resistance characteristic would be obtained for the network. Similarly in Fig. 1, the heating coils $r_1$ and $r_2$ could be connected in series between the terminals 3 and 4 instead of in parallel; in this case, however, the rectifiers $X_1$ and $X_2$ would be connected to shunt the heating coils $r_1$ and $r_2$ respectively and would be oppositely directed so that these coils would be alternately short circuited during positive and negative half waves of the alternating current.

Likewise, in Fig. 2 the resistance elements $R_3$ and $R_4$ could be connected in series between the terminals 1 and 2 instead of in parallel, each being shunted by the corresponding rectifier $X_3$ or $X_4$ which will be oppositely directed so as to short-circuit $R_3$ and $R_4$ for the alternate half waves.

Furthermore, in any of the arrangements which have been described, the two thermistors need not be similar in resistance or have like characteristics; for example, they could have temperature coefficients of resistance of opposite sign, whereby fresh series of resistance characteristics for the network would be obtained.

What is claimed is:

1. A non-linear electrical resistance network for connection to a first source supplying both alternating and direct current simultaneously, including two thermistors, means for supplying the positive half wave of the alternating current to one thermistor only and means for supplying the negative half wave to the other thermistor only, said means together comprising two oppositely directed rectifiers connected respectively to said two thermistors, whereby the variation limits of said thermistors are increased, and also including means for preventing direct current from the said source from flowing through either of the thermistors.

2. A network according to claim 1, in which said direct current preventing means include a second source of direct current connected in series between said source and said network, and means for making the polarity and voltage of said second source substantially opposite and equal to the direct supplied by said first source.

3. A network according to claim 1, in which said two thermistors have temperature coefficients of resistance of opposite signs, whereby the resistance characteristics of said network are altered.

PRAFULLA KUMAR CHATTERJEA.
CHARLES THOMAS SCULLY.

REFERENCES CITED

The following references are of record in the file of this patent:

UNITED STATES PATENTS

| Number    | Name   | Date          |
|-----------|--------|---------------|
| 2,181,579 | Curtis | Nov. 28, 1939 |
| 2,212,832 | Holzer | Aug. 27, 1940 |

FOREIGN PATENTS

| Number  | Country     | Date          |
|---------|-------------|---------------|
| 163,363 | Switzerland | Aug. 15, 1933 |
| 728,191 | France      | Apr. 11, 1932 |